(12) United States Patent
Takatori

(10) Patent No.: US 6,894,743 B1
(45) Date of Patent: May 17, 2005

(54) LIQUID CRYSTAL OPTICAL MODULATION ELEMENT, AND COLOR FILTER AND LIQUID CRYSTAL DISPLAY DEVICE USING THE SAME

(75) Inventor: Ken-ichi Takatori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/492,231

(22) Filed: Jan. 27, 2000

(30) Foreign Application Priority Data

Jan. 27, 1999 (JP) .......................................... 11-019095

(51) Int. Cl.⁷ .......................................... G02F 1/1335
(52) U.S. Cl. ..................................... 349/106; 349/113
(58) Field of Search ........................................ 329/113

(56) References Cited

U.S. PATENT DOCUMENTS 5,818,554 A * 10/1998 Hiyama et al. ............... 349/67
5,841,496 A * 11/1998 Itoh et al. .................... 349/113
6,091,469 A * 7/2000 Naito ........................... 349/113

FOREIGN PATENT DOCUMENTS

| | | |
|---|---|---|
| JP | 6-3706 | 1/1994 |
| JP | 7-120792 | 5/1995 |
| JP | 7-159813 | 6/1995 |
| JP | 7-209662 | 8/1995 |

* cited by examiner

*Primary Examiner*—James A. Dudek
(74) *Attorney, Agent, or Firm*—Sughrue Mion, PLLC

(57) ABSTRACT

An optical modulation element includes a liquid crystal layer, white light source, and at least one flat mirror. The liquid crystal layer has a helix pitch and is held between a pair of transparent substrates having opposing transparent electrodes. The white light source sends white light onto a surface of one of the transparent substrates of the liquid crystal layer in an oblique direction. The flat mirror is arranged outside the other one of the transparent substrates to reflect the incident light transmitted through the liquid crystal layer toward the light source.

47 Claims, 18 Drawing Sheets

LIQUID CRYSTAL OPTICAL MODULATION ELEMENT, AND COLOR FILTER AND LIQUID CRYSTAL DISPLAY DEVICE USING THE SAME

BACKGROUND OF THE INVENTION

1. Field of the Invention

The present invention relates to a liquid crystal optical modulation element and, more particularly, to a liquid crystal optical modulation element for selectively deriving a light beam within a predetermined wavelength range from white light, and a color filter and a liquid crystal display device using this element.

2. Description of the Prior Art

As field sequential display elements, various types of elements have been proposed. For example, a display element using a color filter disk is shown in Shunsuke Kobayashi "Color Liquid Crystal Display", 1990, p. 117. According to this method, a color filter disk selectively colored in red, green, and blue, which are the three primary colors of light, is placed in front of a monochromatic CRT, and is rotated in synchronism with display operation. This enables color display. When a color filter disk is placed in front of a white light source and a black shutter (monochromatic shutter type display element) is combined with them, color display is similarly possible.

Another method is described in "Color Liquid Crystal Display" cited above, pp. 120 and 121. This method performs field sequential color display by inserting a combination of two high-speed liquid crystal display elements called π cells, a polarization plate, and three color polarization plates in front of a monochromatic CRT.

"Color Liquid Crystal Display" cited above also shows, on pp. 122 and 123, a case wherein a CRT, an LED, or a cold cathode tube is used as a backlight and a liquid lb crystal display is used as a black shutter. According to this method, backlights of three primary colors are prepared and are flashed alternately at a high speed. An example of this arrangement is shown in *Gekkan Display*, July 1998, pp. 11 to 16 as a field sequential full-color LCD. In this example, cold cathode tube backlights serving as illumination light sources of a currently available liquid crystal display device are switched on the time base among red, green, and blue.

In this manner, techniques that perform field sequential display in accordance with various methods have been conventionally proposed.

According to the conventional methods which respectively use, among the field sequential display elements, the color disk, and the three polarization plates and the π cells have a drawback of a low light utilization due to the presence of a light absorption layer. This is because the color disk method must use a color filter that absorbs light having a wavelength outside a specific wavelength range, and the method using the π cells requires a polarization plate using a light absorber in order to generate polarized light.

According to the conventional method which uses, among the field sequential display elements, the backlight has a drawback that it must use three types of light sources. More specifically, in additive mixture of color stimuli using three primary colors of light, three types of light are indispensable, and light sources of three different colors corresponding to the three primary colors are required. This increases the size of the device and complicates a light source driving circuit, making downsizing and cost reduction very difficult.

SUMMARY OF THE INVENTION

The present invention has been made in consideration of the above situation. It is the first object of the present invention to provide an optical modulation element in which light loss is small and which can separate light from a light source in units of wavelength ranges.

It is the second object of the present invention to provide an optical modulation element which can separate light from a light source into light beams of wavelength ranges selected by an applied signal with a small optical loss.

It is the third object of the present invention to provide an optical modulation element which can convert a light beam within a specific wavelength range into a linearly polarized beam and output it to become incident on a liquid crystal element without any optical loss.

It is the fourth object of the present invention to provide a field sequential type display device using this optical modulation element.

It is the fifth object of the present invention to provide direct-viewing, refection, and projection type display devices each using this optical modulation element.

It is the sixth object of the present invention to simplify the circuit and device arrangement of these elements and devices.

It is the seventh object of the present invention to increase the operation speed of these elements and devices.

In order to achieve the above objects, according to the primary aspect of the present invention, there is provided a liquid crystal optical modulation element in which a liquid crystal having a helix pitch is held between a pair of transparent substrates having opposing transparent electrodes, or between a transparent substrate, having an electrode capable of applying an electric field in a direction parallel to a substrate surface, and a transparent substrate opposing it, and a flat, L-shaped, or saw-toothed mirror is arranged on a side opposite to a liquid crystal holding portion of one of the transparent substrates, and a color filter and a liquid crystal display device using this liquid crystal optical modulation element.

White light emitted by an ordinary light source can be split into light beams having three primary colors of red, green, and blue, and the beam of each color into right and left circularly polarized light beams. In other words, white light is comprised of six types of circularly polarized light beams, e.g., red right and left polarized light, that are defined by the color and direction of the circularly polarized light beam.

A liquid crystal having a spiral has a characteristic feature in that it selectively reflects light. Selective reflection means reflection of only a circularly polarized light beam of a sense defined by the chirality (handedness) of the spiral of light within a wavelength range defined by the helix pitch (period). For example, a left-handed liquid crystal reflects a left circularly polarized light beam. Selective reflection is different from ordinary reflection in that it does not change the rotating direction of the circularly polarized light beam (by reflection with an ordinary mirror, the right (left) circularly polarized light beam is reflected to appear as a left (right) polarized light beam).

Reflection by moleculars oriented to have this spiral periodic structure has the following characteristics. More specifically, when molecules orient themselves with a helix pitch of p, of incident light coming parallel to the helix axis, a light beam having a wavelength λ indicated by:

$$\lambda = n \cdot p \qquad (1)$$

where n is the average refractive index of the liquid crystal as the center wavelength is reflected.

A width Δλ of the wavelength range of the light reflected around the wavelength of equation (1) as the center is expressed by:

$$\Delta\lambda = p \cdot \Delta n \quad (2)$$

where Δn is the anisotropy of the refractive index.

When incident light has an incident angle θ, a light beam having a wavelength satisfying the condition for the Bragg reflection expressed by:

$$p \cdot \cos\theta = \lambda/n \quad (3)$$

is selectively reflected. As a result, when light is incident from an oblique direction to form an angle, the selected wavelength shifts to the short-wavelength side.

As is apparent from the aspect described above, the present invention does not use a polarization plate or color filter, but uses a mirror and a liquid crystal having a spiral structure that reflects light selectively. Therefore, a light beam within a specific wavelength range can be obtained from white light with only a small optical loss.

An electrode structure matching the operation mode of the liquid crystal is used and three unit elements are arranged to form angles among them. Since the liquid crystal need only perform on/off operation, it can operate regardless of its operation mode.

Since the electrode is formed in accordance with the sequential scanning direction of the liquid crystal display element, sequential scanning can be performed in synchronism with the liquid crystal display element.

Respective circularly polarized light beams are output such that their optical paths do not overlap, and after that each polarized light is converted by λ/4 plates and a λ/2 plate. Therefore, all the light beams within the specific wavelength range can be extracted as linearly polarized light beams having the same direction.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Figure 1:
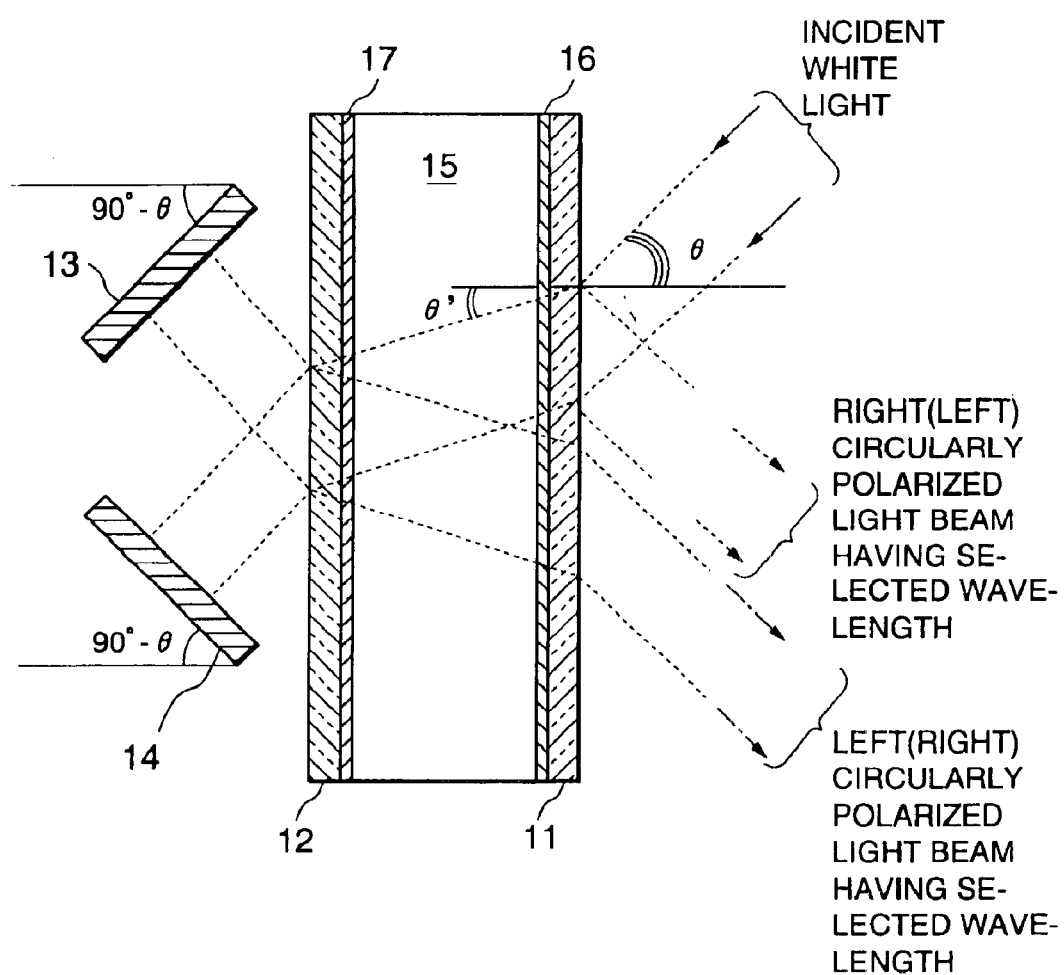
FIG. 1 is a sectional view showing the schematic arrangement of a liquid crystal optical modulation element according to the first embodiment of the present invention.

The operation of a liquid crystal optical modulation element according to the present invention will be described with reference to FIG. 1 and FIGS. 2A to 2I. Of white light (comprised of six types of light beams as described above) which becomes incident on the liquid crystal optical modulation element according to the present invention at a predetermined angle θ as shown in FIG. 1, only a circularly polarized light beam within a selected wavelength range defined by the incident angle, defined by the helix pitch and the chirality (handedness) of the helix is selectively reflected.

Figure 2A:
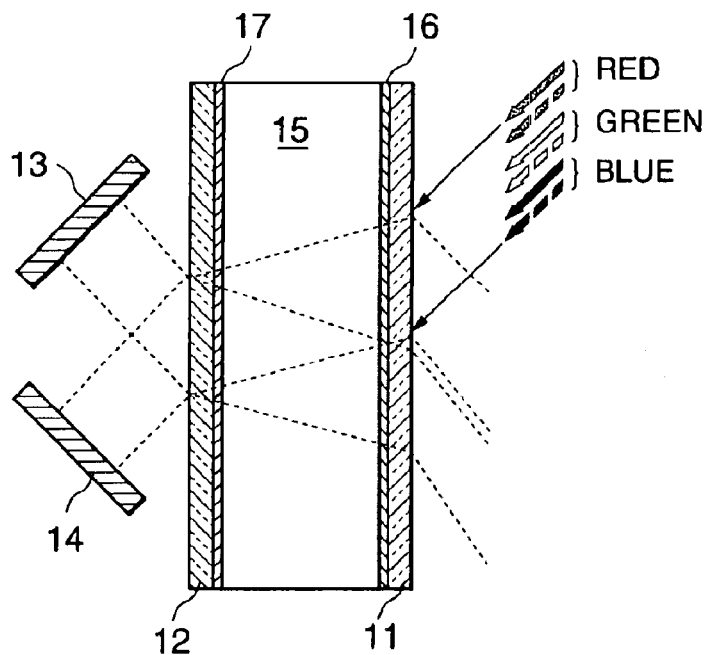
FIGS. 2A to 2I are views explaining the operation of the liquid crystal optical modulation element according to the present invention.
Figure 2B:
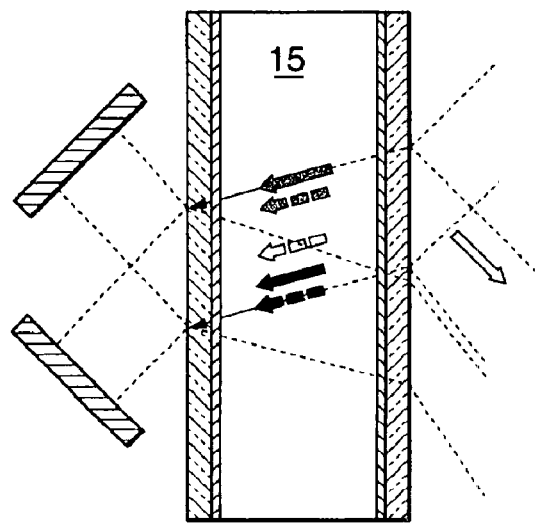
Figure 2C:
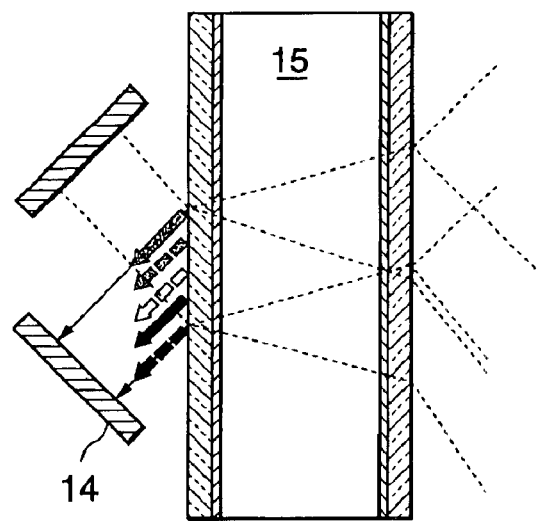
Figure 2D:
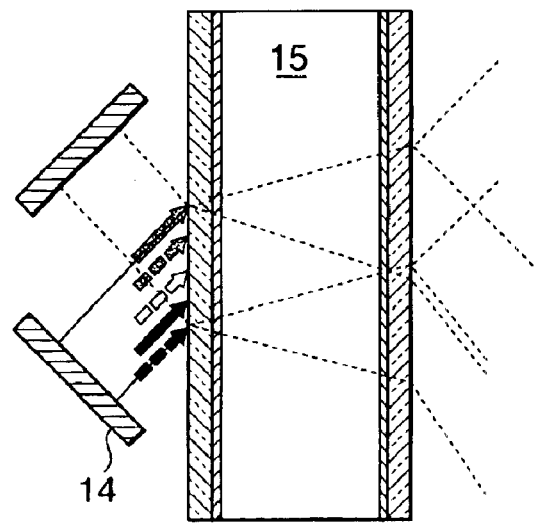
Figure 2E:
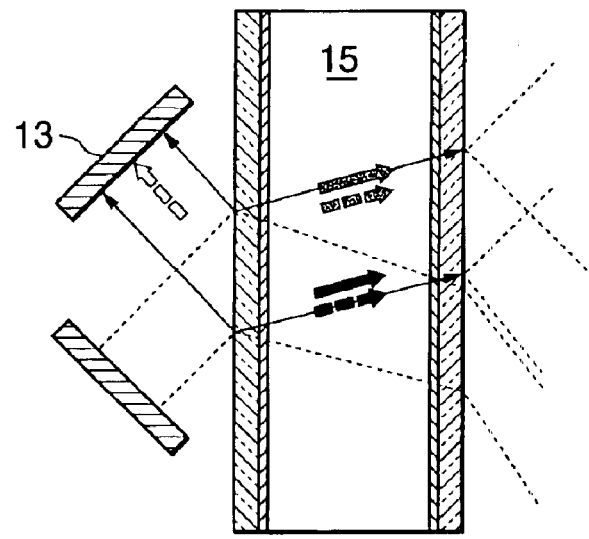
Figure 2F:
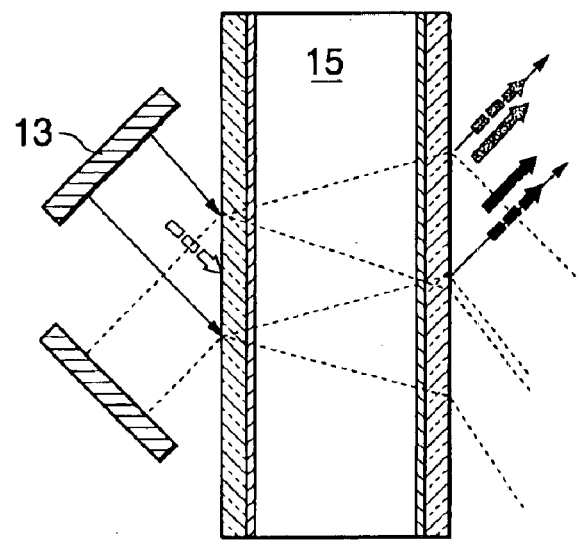
Figure 2G:
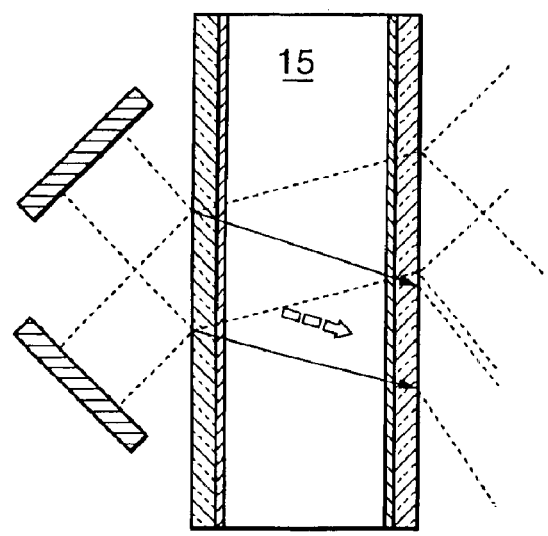
Figure 2H:
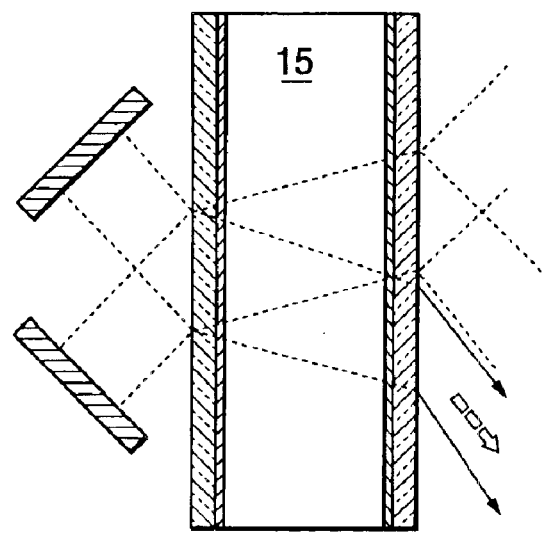
Figure 2I:
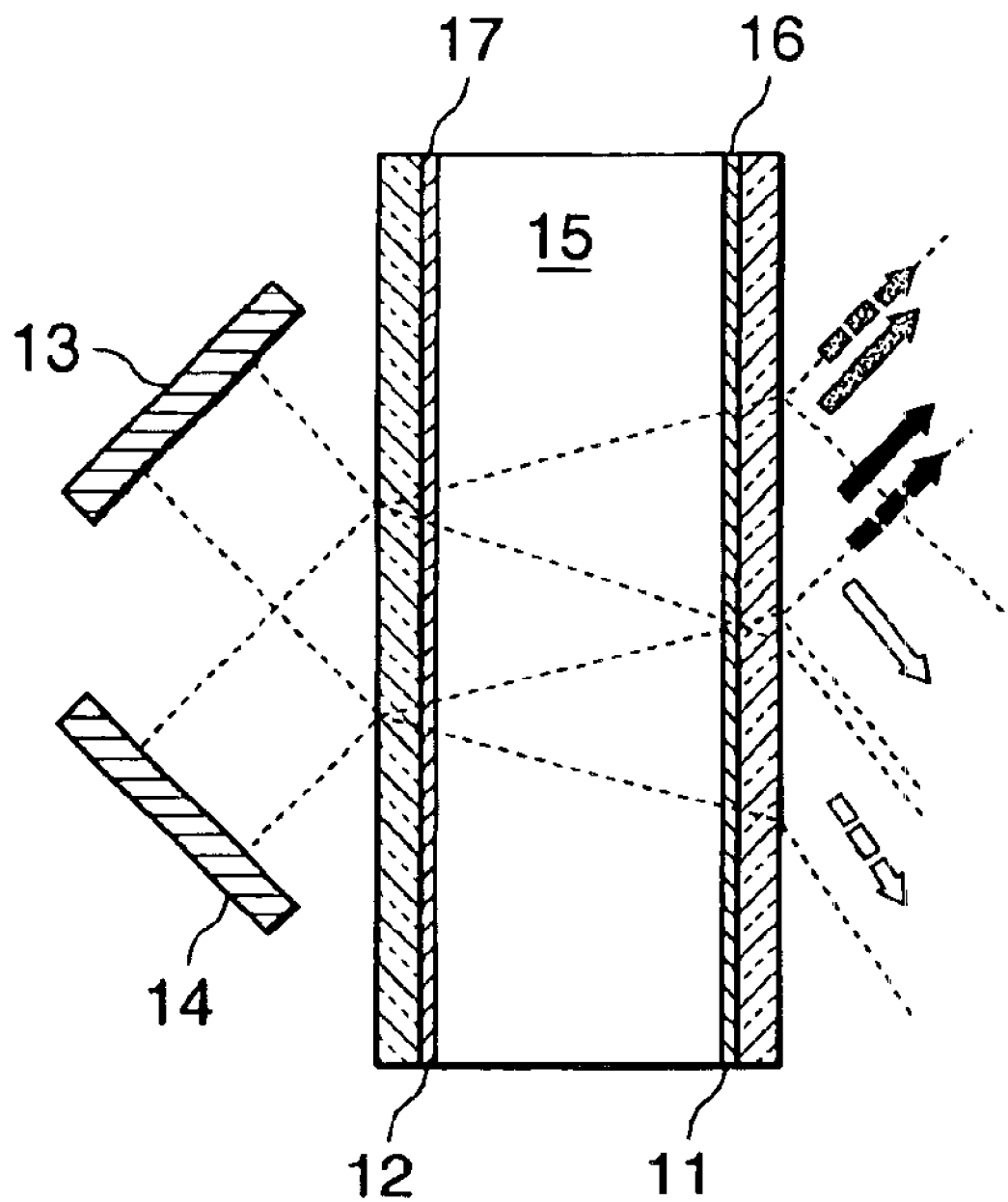

Assume that the wavelength range of selective reflection is green, and that the circularly polarized light beam defined by the chirality of the helix is a right circularly polarized light beam. In FIGS. 2A to 2I, thick arrows indicate right circularly polarized light beams, and thick broken arrows indicate left circularly polarized light beams. Of the incident white light shown in FIG. 2A, only a green right circularly polarized light beam is selectively reflected by the helix, as shown in FIG. 2B. Light beams (light beams other than the selectively reflected light beams) transmitted through the helix in FIG. 2B reach a mirror 14 (FIG. 2C) and are reflected after their directions of polarization are changed (FIG. 2D). As a result, of the incident white light, a green left circularly polarized light beam is converted into a green right circularly polarized light beam, which then enters a liquid crystal layer again and is selectively reflected, as shown in FIG. 2E. The selectively reflected green right circularly polarized light beam is reflected by a mirror 13 after its direction of polarization is changed by 180°, and the reflected light returns into the green left circularly polarized light beam (FIG. 2F). Light beams other than the green light beams return to the light source, as shown in FIG. 2F. The green left circularly polarized light beam reflected by the mirror 13 is transmitted through the liquid crystal layer as shown in FIG. 2G, and emerges from it as shown in FIG. 2H. Hence, of the incident white light shown in FIG. 2A, the green right and left circularly polarized light beams are reflected, and light beams other than the green light beams return to the light source, as shown in FIG. 2I.

As a result, of the incident white light, all the circularly polarized light beams having the selected wavelength can be derived while the remaining light beams return to the light source. When mirrors are provided to the light source, the light beams returned to the light source reciprocate between the mirror and the liquid crystal optical modulation element of the present invention substantially with no loss.

When an electric field is applied to the liquid crystal layer to change the helix pitch, the selected wavelength can be changed. The light beams reciprocating between the liquid crystal optical modulation element and the mirror emerge when their wavelength ranges coincide with the selected wavelength. The electric field is applied either in a direction perpendicular or parallel to the substrate surface by selecting the structure of the element in accordance with the operation of the liquid crystal.

Several preferred embodiments of the present invention will be described with reference to the accompanying drawings.

FIG. 1 is a sectional view of a liquid crystal optical modulation element according to the first embodiment of the present invention. Referring to FIG. 1, a liquid crystal 15 having a helix pitch is held between a pair of transparent substrates 11 and 12 respectively formed with transparent electrodes 16 and 17. A mirror 14 is set to reflect, of incident white light, all light beams, which have been refracted and transmitted through the liquid crystal, to be parallel to the transmitted light beams and in directions opposite to them. A mirror 13 is set to reflect all the light beams, which have been reflected by the mirror 14 and have entered the liquid crystal layer again to be selectively reflected by it, to be parallel to the selectively reflected light beams and in directions opposite to them.

When the refractive indices of the transparent substrates 11 and 12 are the same and the refractive indices of the incident-side medium and the mirror-side medium are the same (in the embodiments of the present invention, the refractive indices need not meet these conditions, and in that case, optimal angles are selected when setting the mirrors), the mirrors described above are set at the following angles. When light becomes incident at an angle θ with respect to the direction of normal to the substrate surface, the mirrors 13 and 14 are set at an angle 90°−θ with respect to the direction of normal to the substrate surface. The mirrors 13 and 14 are set not to interfere with the optical paths. In the first embodiment, the sum of the thicknesses of the transparent substrates 11 and 12 and liquid crystal layer 15 is set such that the optical paths of the selectively reflected light beams of the white light and the optical paths of the selectively reflected light beams thereof through the mirrors 13 and 14 do not overlap each other.

The basic operation of the first embodiment of the present invention is identical to that described above with reference to FIGS. 2A and 2I, and a repetitive flu explanation thereof will be omitted. When the electric field to be applied to the liquid crystal layer 15 can be changed by the transparent electrodes 16 and 17, so that the helix pitch of the liquid crystal 15 is changed, the selected wavelength can be changed. Of the white light emerging from the light source to become incident on the transparent substrate 11, only light beams within a specific wavelength range specified by a signal applied to the transparent electrodes 16 and 17 are selectively reflected, and light beams other than those within the specific wavelength range return to the light source, by the effect described with reference to FIG. 3 above.

Figure 3:
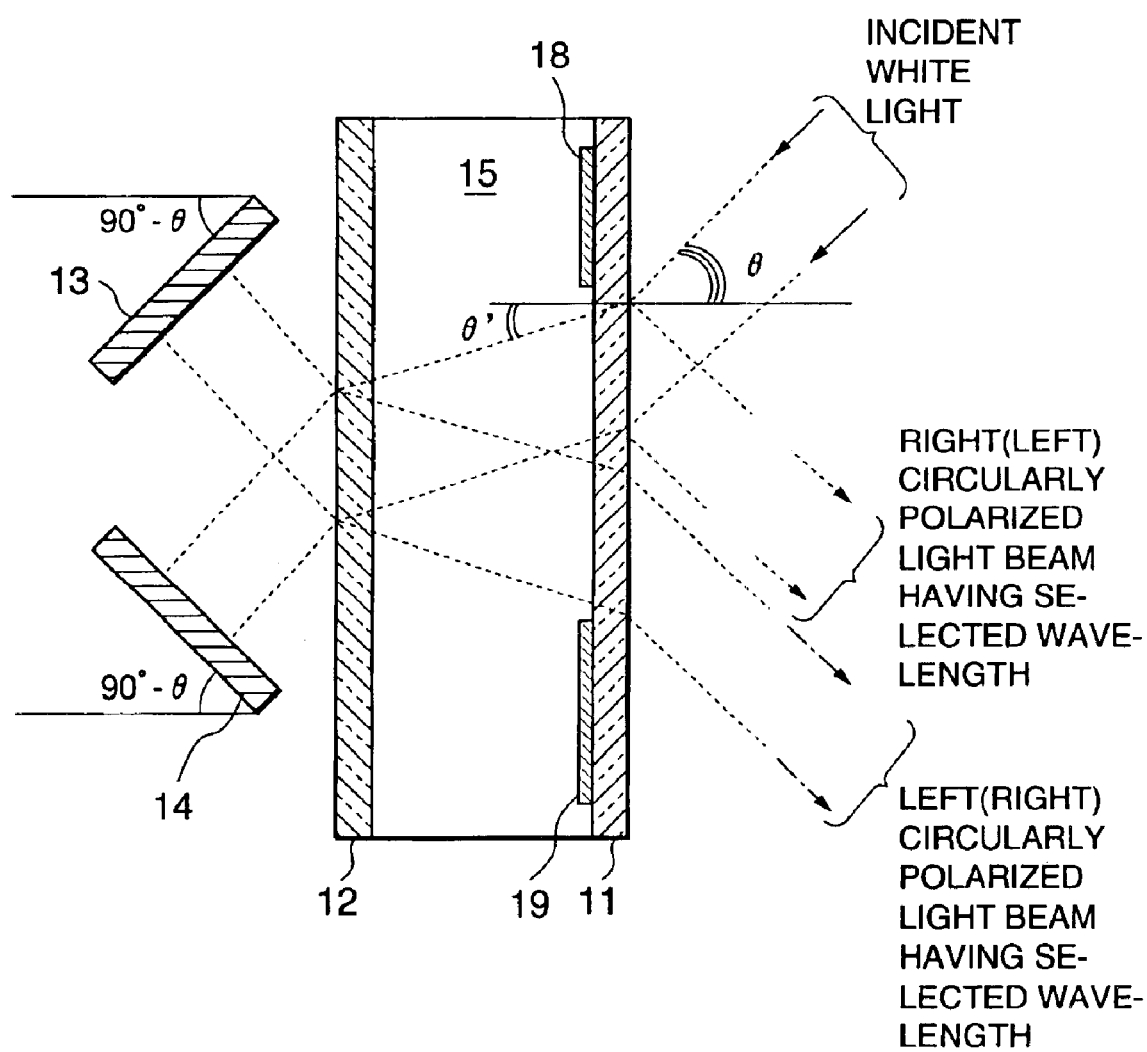
FIG. 3 is a sectional view showing the schematic arrangement of a liquid crystal optical modulation element according to the second embodiment of the present invention.

FIG. 3 is a sectional view of a liquid crystal optical modulation element according to the second embodiment of the present invention. The second embodiment has the same arrangement as that of the first embodiment except that patterned electrodes 18 and 19 are formed, in place of the transparent electrodes 16 and 17 of the first embodiment, on a transparent substrate 11.

In the second embodiment, when an electric field is applied across the electrodes 15 and 19 in a direction parallel to the substrates, the helix pitch of a liquid crystal 15 changes. As a result, only light beams within a wavelength range specified by the strength of the applied electric field are entirely, selectively reflected, in the same manner as in the first embodiment.

When the patterned electrodes 18 and 19 are formed interdigitally such that their teeth fit each other, they can increase the strength of the electric field. Although the electrodes are not present in the optical paths in FIG. 3 so as not to interfere with the optical paths of the incident and exit light beams, each electrode may be partly present in the optical path. The transparent substrate having the patterned electrodes 18 and 19 serves as the incident-side transparent substrate 11. Alternatively, electrodes 18 and 19 may be formed on a mirror-side transparent substrate 12.

Figure 4:
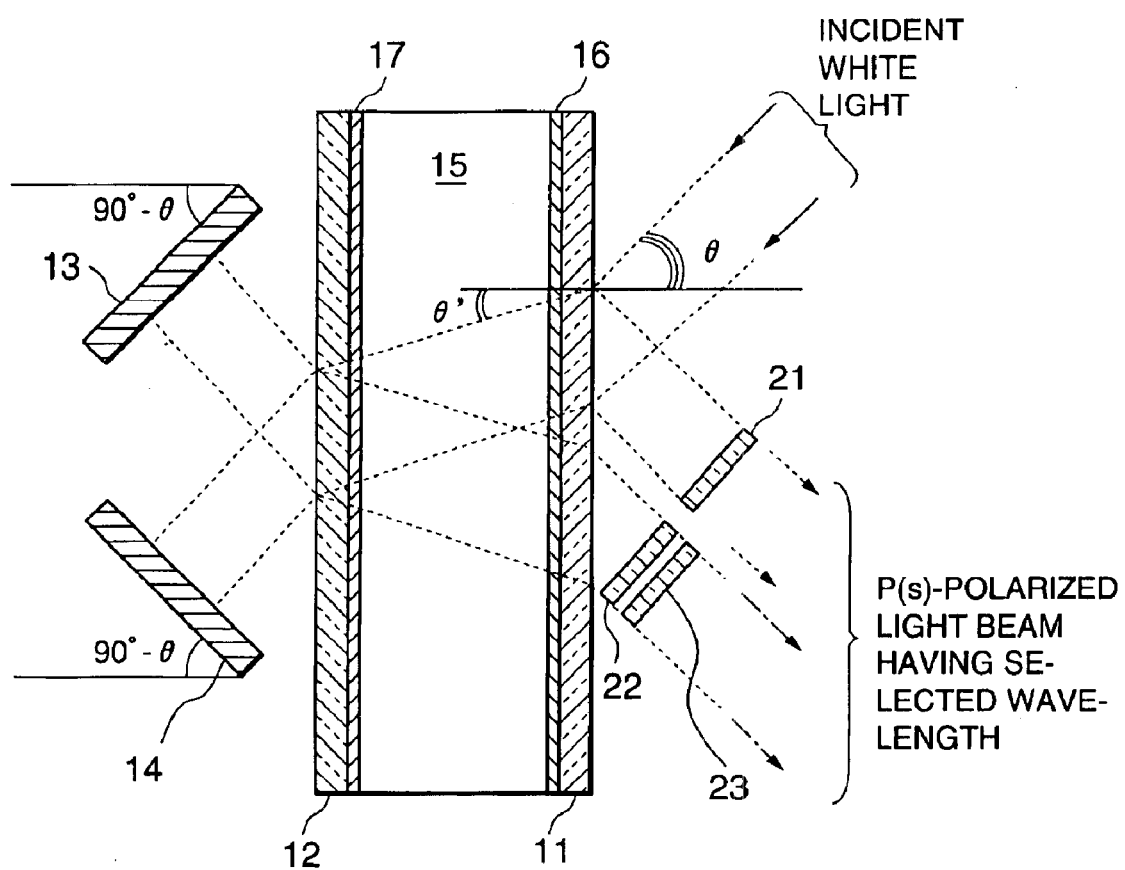
FIG. 4 is a sectional view showing the schematic arrangement of a liquid crystal optical modulation element according to the third embodiment of the present invention.

FIG. 4 is a sectional view of a liquid crystal optical modulation element according to the third embodiment of the present invention. The third embodiment is different from the first embodiment in the following respects. An element 21, such as a λ/4 plate, for converting circularly polarized light beams into linearly polarized light beams is inserted in one optical path (in FIG. 4, a right (left) circularly polarized light beam directly, selectively reflected from incident white light) of an exit selected wavelength light beam. An element 22 and a rotational polarizer 23, such as a λ/2 plate, for converting circularly polarized light beams into linearly polarized light beams are inserted in the other optical path (in FIG. 4, a left (right) circularly polarized light beam selectively reflected through mirrors 13) of the emerging light beam having the selected wavelength.

This structure can convert all the right and left circularly polarized light beams separately into p- or s-polarized linear polarized light beams. This is because one circularly polarized light beam is converted into a p (s) linearly polarized light beam with the λ/4 plate 21, and the other circularly polarized light beam is converted into an s (p) polarized light beam with the λ/4 plate 22 and then into a p (s) polarized light beam with the λ/2 plate 23. Therefore, the incident white light becomes p (s)-wave linearly polarized light beam within a specific wavelength range. When this liquid crystal optical modulation element is used in combination with a liquid crystal element (usually, a polarizer is mounted on the incident side) using specific polarization, the polarizer need not be used. Even when a polarization element is used on the incident side of the liquid crystal element, since little light is absorbed by the polarizer, the light utilization Increases.

Concerning the order of inserting the λ/4 plate and λ/2 plate, in FIG. 4, the λ/4 plate 22 is inserted first and then the λ/2 plate 23 is inserted with respect to the propagating direction of the emerging light. This order may be reversed: the λ/2 plate 23 may be inserted first and then the λ/4 plate 22 may be inserted. When the λ/4 plate 22 and λ/2 plate 23 are inserted in the latter order, a circularly polarized light beam having a specific direction is converted by the λ/2 plate 23 into a circularly polarized light beam having an opposite direction, and then it is converted by the λ/4 plate 22 into a linearly polarized light beam. Although the λ/4 plates 21 and 22 are described as separate elements, one λ/4 plate may be used to cover both the optical paths.

Figure 5:
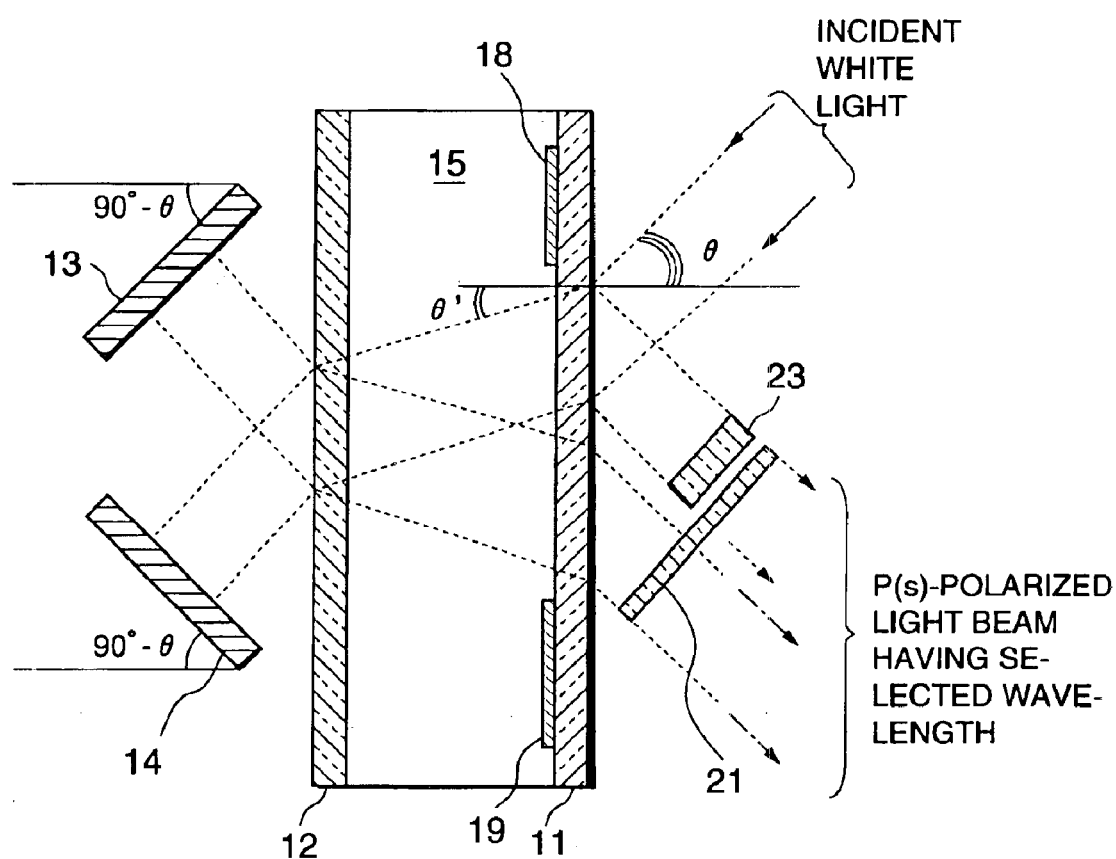
FIG. 5 is a sectional view showing the schematic arrangement of a liquid crystal optical modulation element according to the fourth embodiment of the present invention.

FIG. 5 is a sectional view of a liquid crystal optical modulation element according to the fourth embodiment of the present invention. The fourth embodiment is different from the second embodiment in the following respects. An element 21, e.g., a λ/4 plate, for converting circularly polarized light beams into linearly polarized light beams is inserted in the optical path of an exit light beam having a selected wavelength. A rotational polarizer 23 such as a λ/2 plate is inserted in one optical path (in FIG. 5, a right (left) circularly polarized light beam obtained from white light by direct selective reflection) of the exit light beam having the selected wavelength.

This structure can convert all the right and left circularly polarized light beams separately into p- or s-polarized linear polarized light beams, so that the same operation and effect as those of the third embodiment of the present invention can be obtained. Concerning the order of inserting the λ/4 plate and λ/2 plate, it can be appropriately modified in the same manner as in the third embodiment.

Figure 6:
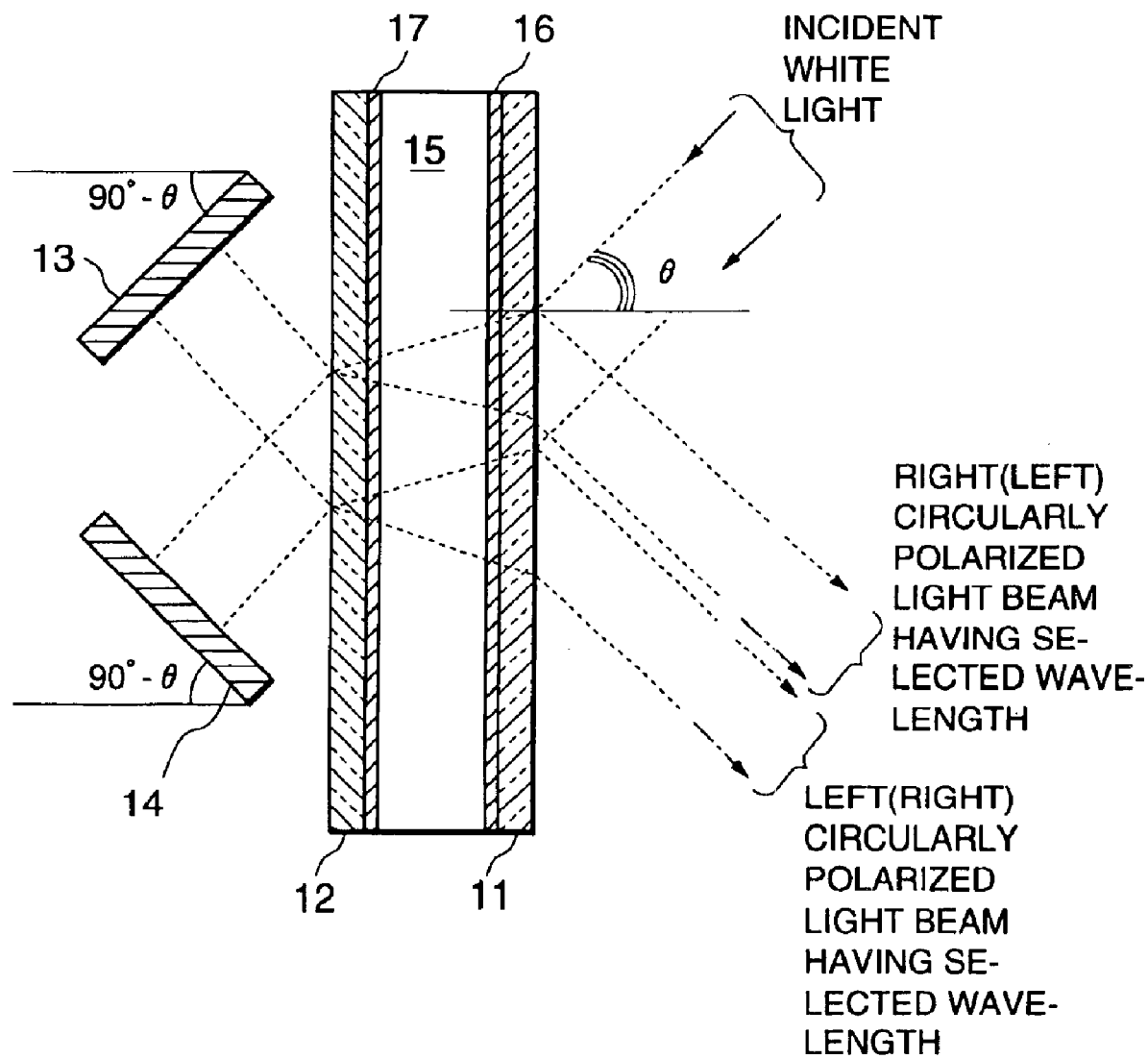
FIG. 6 is a sectional view showing the schematic arrangement of a liquid crystal optical modulation element according to the fifth embodiment of the present invention.

FIG. 6 is a sectional view of a liquid crystal optical modulation element according to the fifth embodiment of the present invention. In the fifth embodiment, a liquid crystal 15 having a helix pitch is held between a pair of transparent substrates 11 and 12 respectively formed with transparent electrodes 16 and 17, in the same manner as in the first embodiment. The thickness of the liquid crystal 15 is smaller than that of the first embodiment. The sum of the thicknesses of the transparent substrates 11 and 12 and liquid crystal 15 is set such that the optical paths of directly, selectively reflected light beams of incident white light and the optical paths of selectively reflected light beams through mirrors 13 and 14 overlap each other as much as possible.

Of the incoming white light coming from the transparent substrate 11 of the liquid crystal optical modulation element, only light beams within a specific wavelength range are selectively reflected within the element, and light beams other than those within the specific wavelength range are returned to the white light source, as described above. The optical paths of directly, selectively reflected light beams and the optical paths of light beams selectively reflected and emerging through the mirrors 13 and 14 of the incident white light almost overlap each other. When an ordinary cholesteric liquid crystal is used, the minimum thickness of a liquid crystal layer necessary for sufficient selective reflection is about 10 μm, and the sum of the thickness of the liquid crystal layer and the thickness of the transparent substrates can be set to several mm or less.

Figure 7:
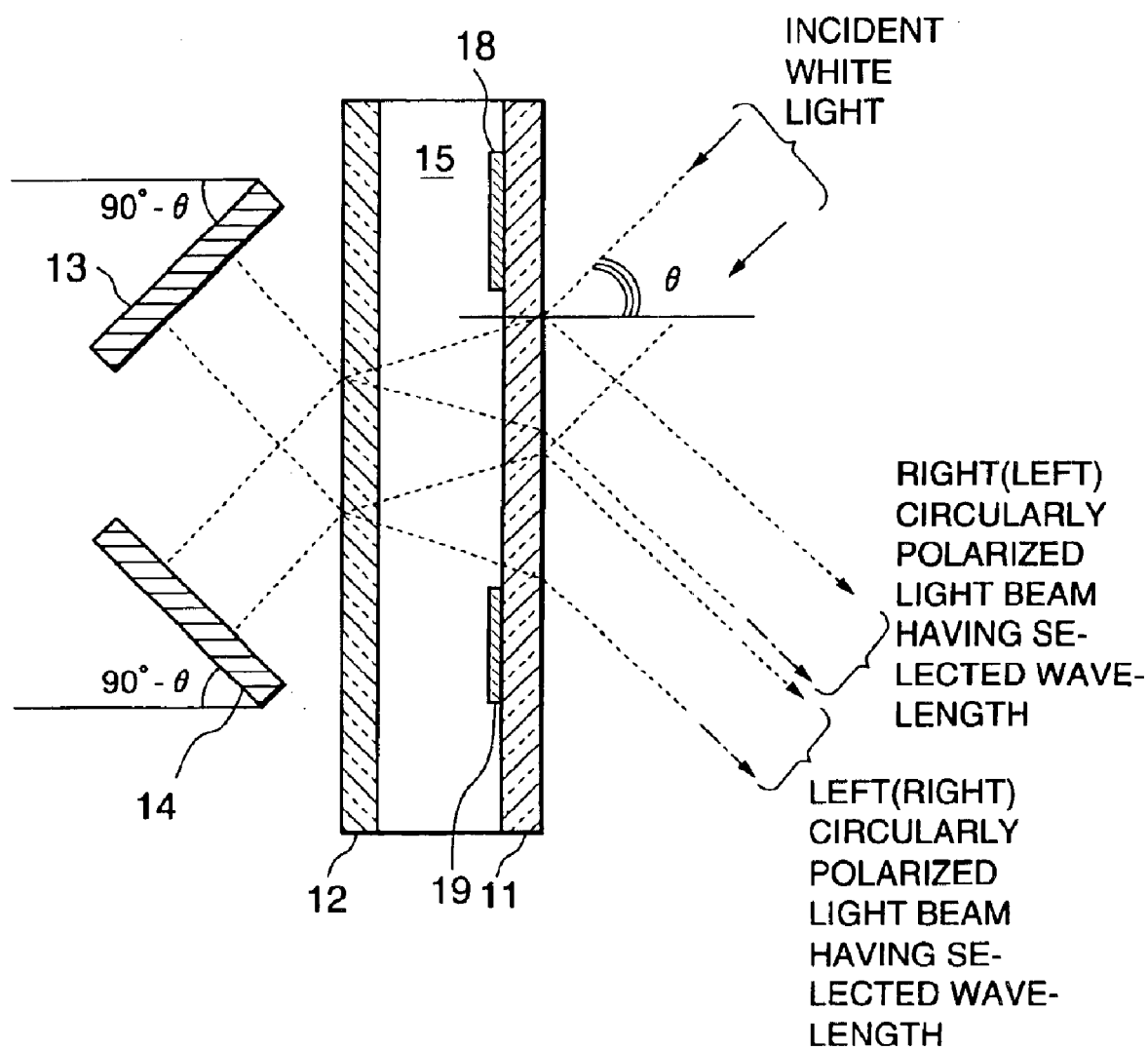
FIG. 7 is a sectional view showing the schematic arrangement of a liquid crystal optical modulation element according to the sixth embodiment of the present invention.

FIG. 7 is a sectional view of a liquid crystal optical modulation element according to the sixth embodiment of the present invention. In the sixth embodiment, a liquid crystal 15 having a helix pitch is held between a transparent substrate 12 and a transparent substrate 11 having patterned electrodes 18 and 19, in the same manner as in the second embodiment. The thickness of the liquid crystal 15 is small, in the same manner as in the fifth embodiment. The sum of the thicknesses of the transparent substrates 11 and 12 and liquid crystal 15 is set such that the optical paths of directly, selectively reflected light beams of incident white light and the optical paths of selectively reflected light beams through mirrors 13 and 14 overlap each other as much as possible.

In the sixth embodiment, when an electric field is applied across the electrodes 18 and 19 in a direction parallel to the substrates, in the same manner as in the second embodiment, the helix pitch of a liquid crystal 15 changes. As a result, only light beams within a specific wavelength range are entirely, selectively reflected, in the same manner as in the fifth embodiment. The optical paths of directly, selectively reflected light beams and the optical paths of light beams selectively reflected and emerging through the mirrors 13 and 14 of the incident white light almost overlap each other.

When the patterned electrodes 18 and 19 are formed interdigitally such that their teeth fit each other, they can increase the strength of the electric field, in the same manner as in the second embodiment. Although the electrodes are not present in the optical paths in FIG. 7 so they do not interfere with the optical paths of the incident and reflected light beams, each electrode may be partly present in the optical path. The transparent substrate having the patterned electrodes serves as the incident-side transparent substrate. Alternatively, this substrate may serve as a mirror-side substrate.

In the embodiments described so far, the two mirrors 13 and 14 are arranged on the transparent substrate 12 side to output both the right and left circularly polarized light beams having the selected wavelength as reflected light beams. Alternatively, the mirrors 13 and 14 need not be two separate mirrors, but may be connected to form one mirror having an L-shaped section. The angle of the L letter is set in accordance with the design conditions.

If the mirror 13 is omitted and only the mirror 14 is arranged, one circularly polarized light beam having the selected wavelength can be output from one transparent substrate 11 as a reflected light beam and the other circularly polarized light beam having the selected wavelength can be output from the other transparent substrate 12 as a transmitted light beam, as shown in FIGS. 2B and 2E.

Figure 8:
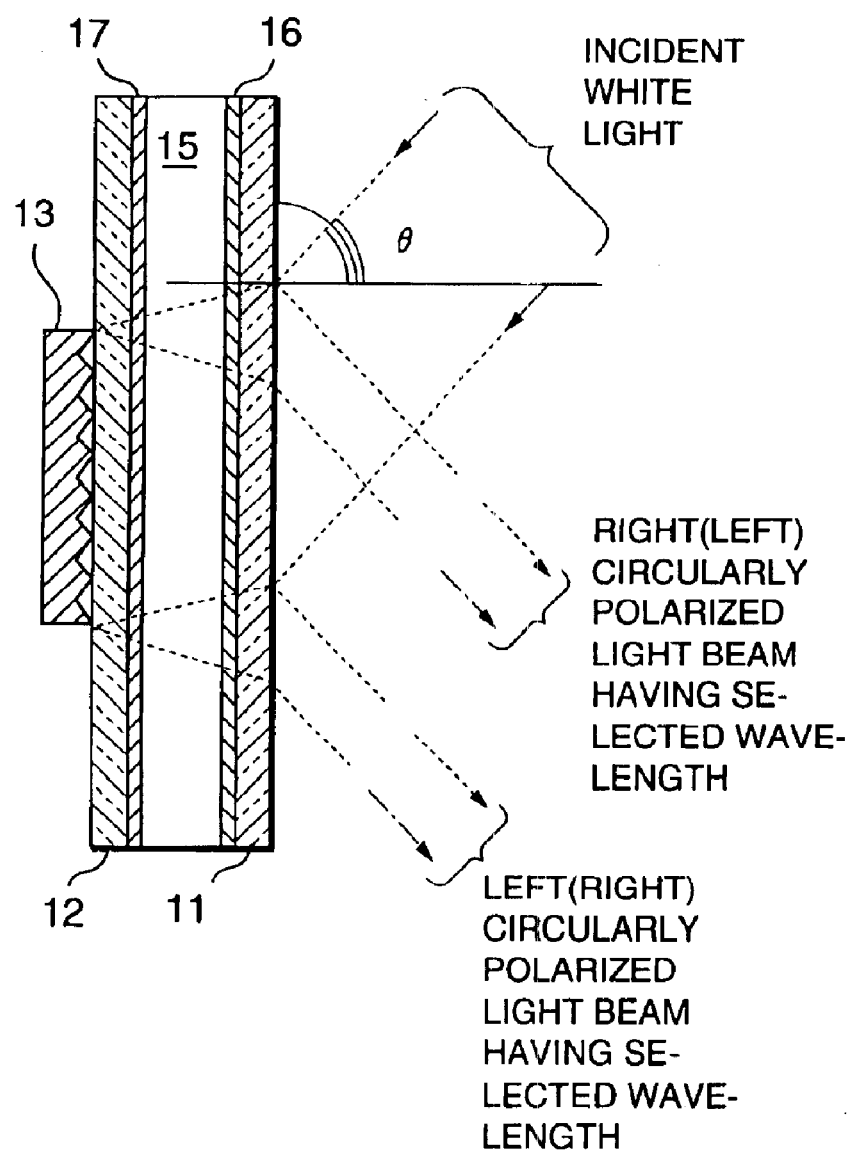
FIG. 8 is a sectional view showing the schematic arrangement of a liquid crystal optical modulation element according to the seventh embodiment of the present invention.

FIG. 8 is a sectional view of a liquid crystal optical modulation element according to the seventh embodiment of the present invention. In the seventh embodiment, a liquid crystal 15 having a helix pitch is held between a pair of transparent substrates 11 and 12 respectively formed with transparent electrodes 16 and 17. A mirror 13 having a saw-toothed section is provided on the transparent substrate 12 side. One reflection surface of the mirror 13 is directed such that it reflects, of incident white light coming from the transparent substrate 11, all the refracted and transmitted light beams to be parallel to the transmitted light beams and in directions opposite to them. The other reflection surface of the mirror 13 is directed such that it reflects all the light beams, which have been reflected by this reflection surface, entered the liquid crystal layer again, and been selectively reflected by the liquid crystal layer, to be parallel to the selectively reflected light beams and in directions opposite to them.

When the refractive indices of the transparent substrates 11 and 12 are the same and the refractive indices of the incident-side medium and the mirror-side medium are the same, and when the incident angle of white light is set at an angle θ with respect to the direction of normal to the substrate surface, the surfaces of the mirror 13 are arranged at an angle 90°−θ with respect to the direction of normal to the substrate surface. In this embodiment as well, of the incident white light coming from the transparent substrate 11 side, only light beams within the specific wavelength range are selectively reflected within the liquid crystal optical modulation element, and light beams other than those within the specific wavelength range return to the light source by the operation described above.

Figure 9:
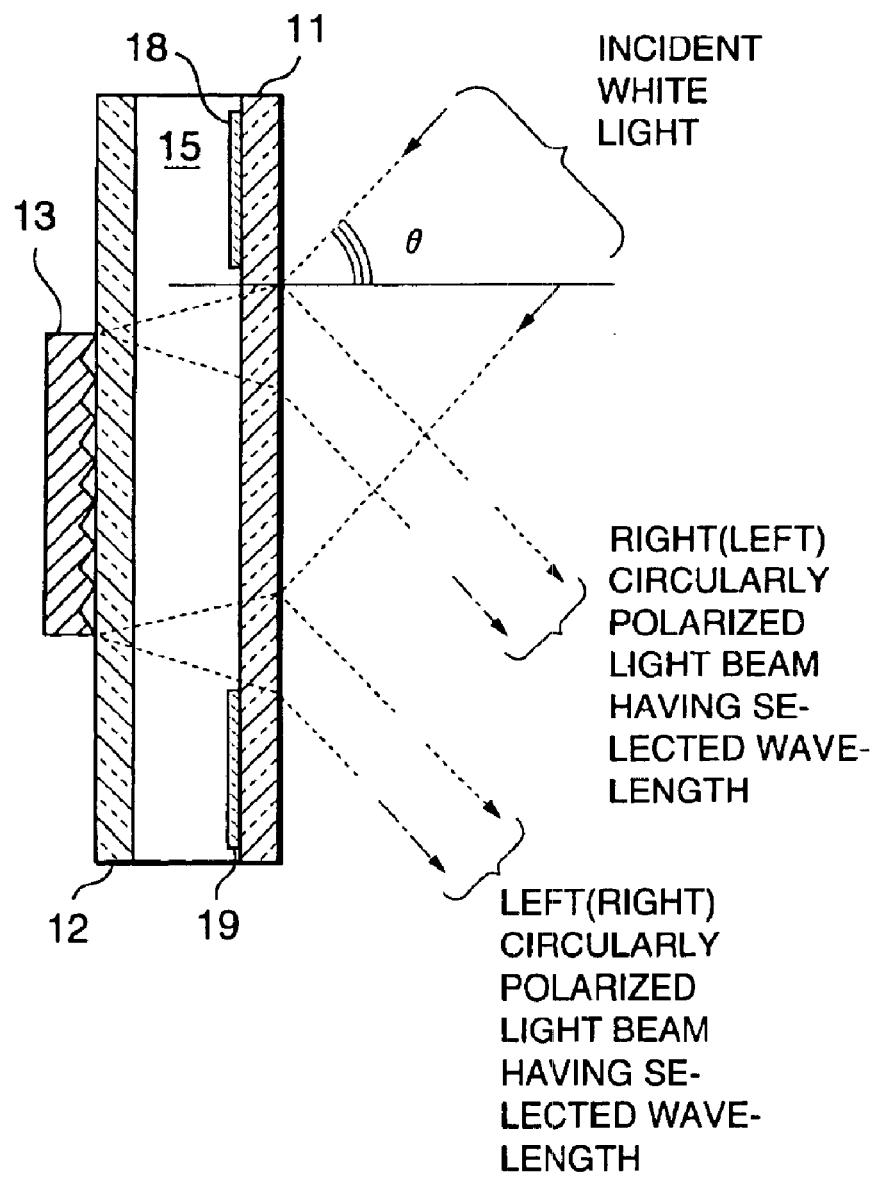
FIG. 9 is a sectional view showing the schematic arrangement of a liquid crystal optical modulation element according to the eighth embodiment of the present invention.

FIG. 9 is a sectional view of a liquid crystal optical modulation element according to the eighth embodiment of the present invention. This embodiment has the same arrangement as that of the seventh embodiment except that patterned electrodes 18 and 19 are formed, in place of the transparent electrodes 16 and 17 of the seventh embodiment, on a transparent substrate 11.

In the eighth embodiment, when an electric field is applied across the electrodes 18 and 19 in a direction parallel to the substrates, the helix pitch of the liquid crystal changes. As a result, only light beams within a specific wavelength range are entirely, selectively reflected, in the same manner as in the second embodiment.

When the patterned electrodes 18 and 19 are formed interdigitally such that their teeth fit each other, they can increase the strength of the electric field, in the same manner as in the second embodiment. Although the electrodes are not present in the optical paths in FIG. 9 so they do not interfere with the optical paths of the incident and exit light beams, each electrode may be partly present in the optical path. The transparent substrate having the patterned electrodes serves as the incident-side transparent substrate. Alternatively, this substrate may serve as a mirror-side substrate.

Figure 10:
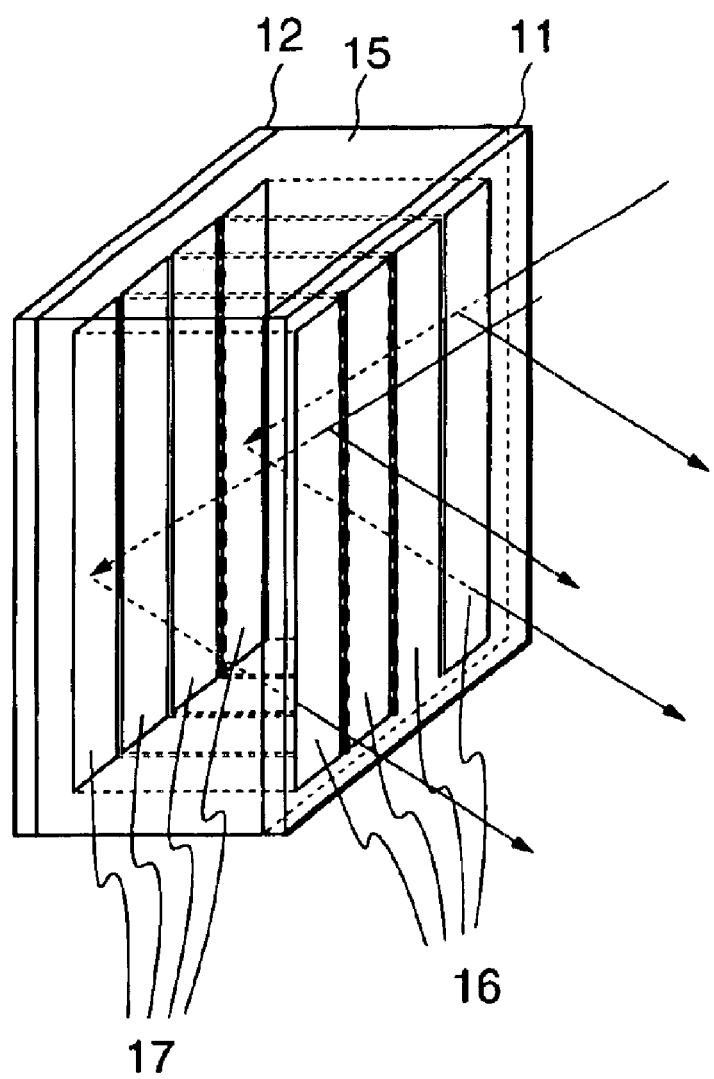
FIG. 10 is a perspective view showing the arrangement of the main part of a liquid crystal optical modulation element according to the ninth embodiment of the present invention.

FIG. 10 is a perspective view showing part of a liquid crystal optical modulation element according to the ninth embodiment of the present invention. In this embodiment, the transparent electrodes of the first, third, fifth, and seventh embodiments described above are replaced with a plurality of patterned transparent electrodes 16 and 17. The patterned electrodes 16 and 17 are stripe electrodes the longitudinal direction of which perpendicularly intersect the group of incident surfaces.

Although not shown, the other substrate 12 may be obtained by integrally forming a transparent substrate and a mirror having a saw-toothed section shown in FIG. 8. Alternatively, if a substrate obtained by applying a transparent film on the flat surface of a mirror having a saw-toothed section is used as a substrate 12, no transparent substrate need be used.

In the ninth embodiment, since the electric field can be applied in units of patterned electrodes independently, the selected wavelength range can be changed in units of electrodes. More specifically, the specific wavelength for selective reflection can be changed in units of electrodes, and sequential scanning can be performed on the time base.

Figure 11:
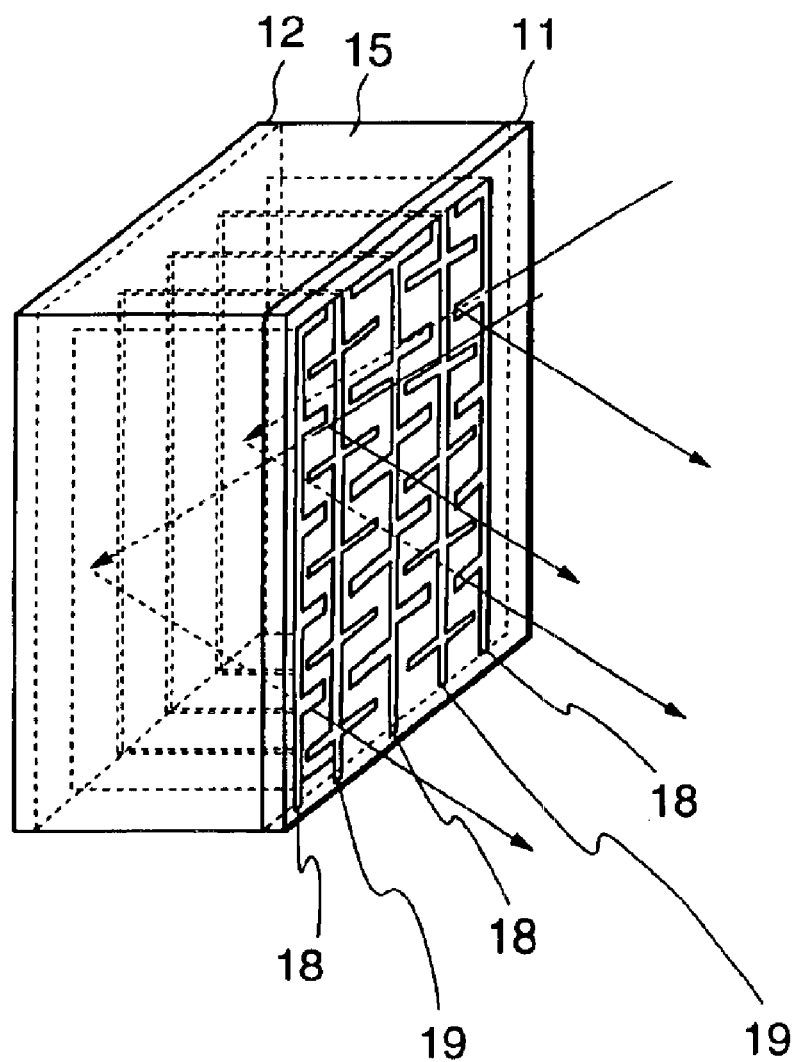
FIG. 11 is a perspective view showing the arrangement of the main part of a liquid crystal optical modulation element according to the tenth embodiment of the present invention.
Figure 12:
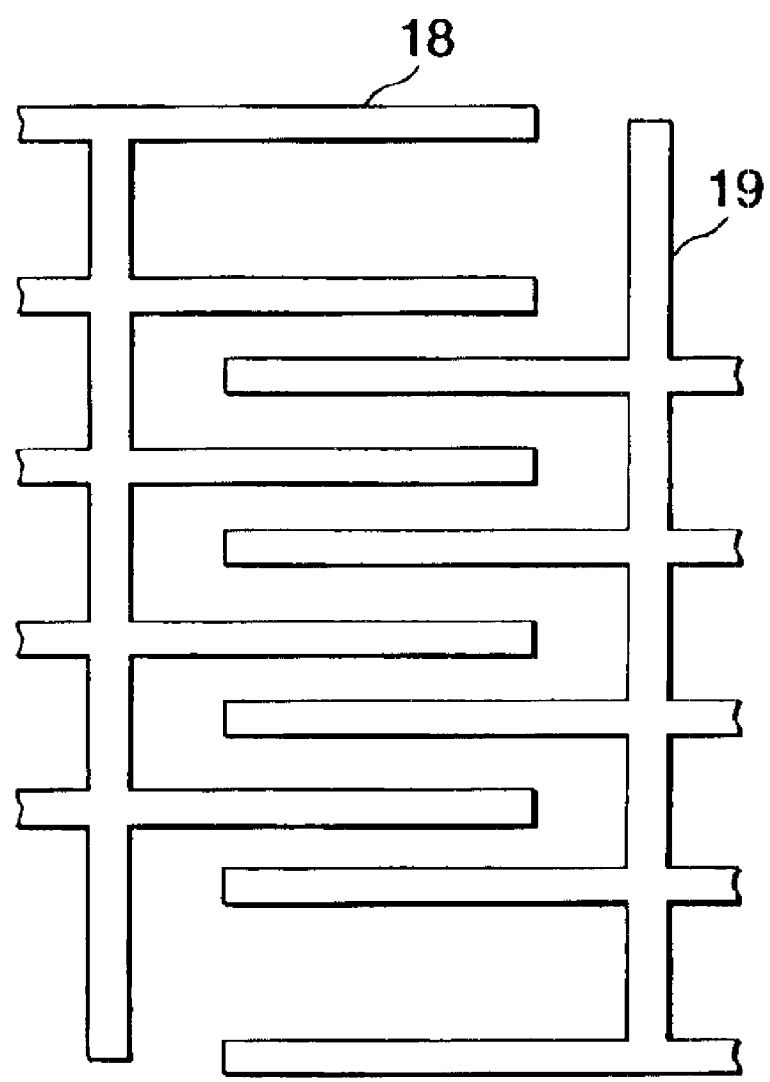
FIG. 12 is a plan view showing interdigital electrodes according to the tenth embodiment of the present invention.

FIG. 11 is a perspective view showing part of a liquid crystal optical modulation element according to the tenth embodiment of the present invention. In this embodiment, the transparent electrodes of the second, fourth, sixth, and eighth embodiments described above are replaced with, e.g., a plurality of interdigitally patterned electrodes 18 and 19 as shown in FIG. 12. The patterned electrodes 18 and 19 form structures divided to perpendicularly intersect the group of incident surfaces. In each structure, an electric field is applied across the electrodes 18 and 19 in a direction parallel to the substrate: surface. Although the transparent substrate having the patterned electrodes serves as the incident-side substrate in FIG. 12, this substrate may serve as a mirror-side substrate.

In the tenth embodiment, since the electric field is applied in units of patterned electrodes independently, the selected wavelength range can be changed in units of electrodes. More specifically, each electrode can perform operation identical to that of the first embodiment, as shown in FIG. 11. As a result, the specific wavelength for transmission can be changed in units of electrodes, and sequential scanning can be performed on the time base.

In the embodiments described above, the medium between the transparent substrates 11 and 12, between mirrors 13 and 14, or between the mirror 13 and the incident light in the direction of incidence has the same refractive index. Alternatively, a low-refractive medium having a lower refractive index than that of the two substrates may be interposed between the transparent substrates 11 and 12, between mirrors 13 and 14, or between the mirror 13 and the incident light in the direction of incidence. When a low-refractive medium is used, the optical path can be changed upon refraction. Therefore, the size of the entire liquid crystal optical modulation element can be reduced.

As the liquid crystal material having the helix pitch, a chiral nematic liquid crystal or a nematic liquid crystal added with a chiral material may be used alone or in combination, or a chiral smectic liquid crystal may be used alone or in combination. As the chiral smectic liquid crystal, a liquid crystal having a chiral smectic CA phase is used alone or in combination.

With an SmC* phase (chiral smectic C phase), selective reflection occurs due to the full-pitch band, and red light is partly, selectively reflected undesirably when selectively reflecting blue light. According to the embodiments of the present invention, since an SmCA* phase (chiral smectic CA phase) is used, selective reflection due to the full-pitch band does not occur, in the same manner as in the chiral nematic liquid crystal.

Figure 13:
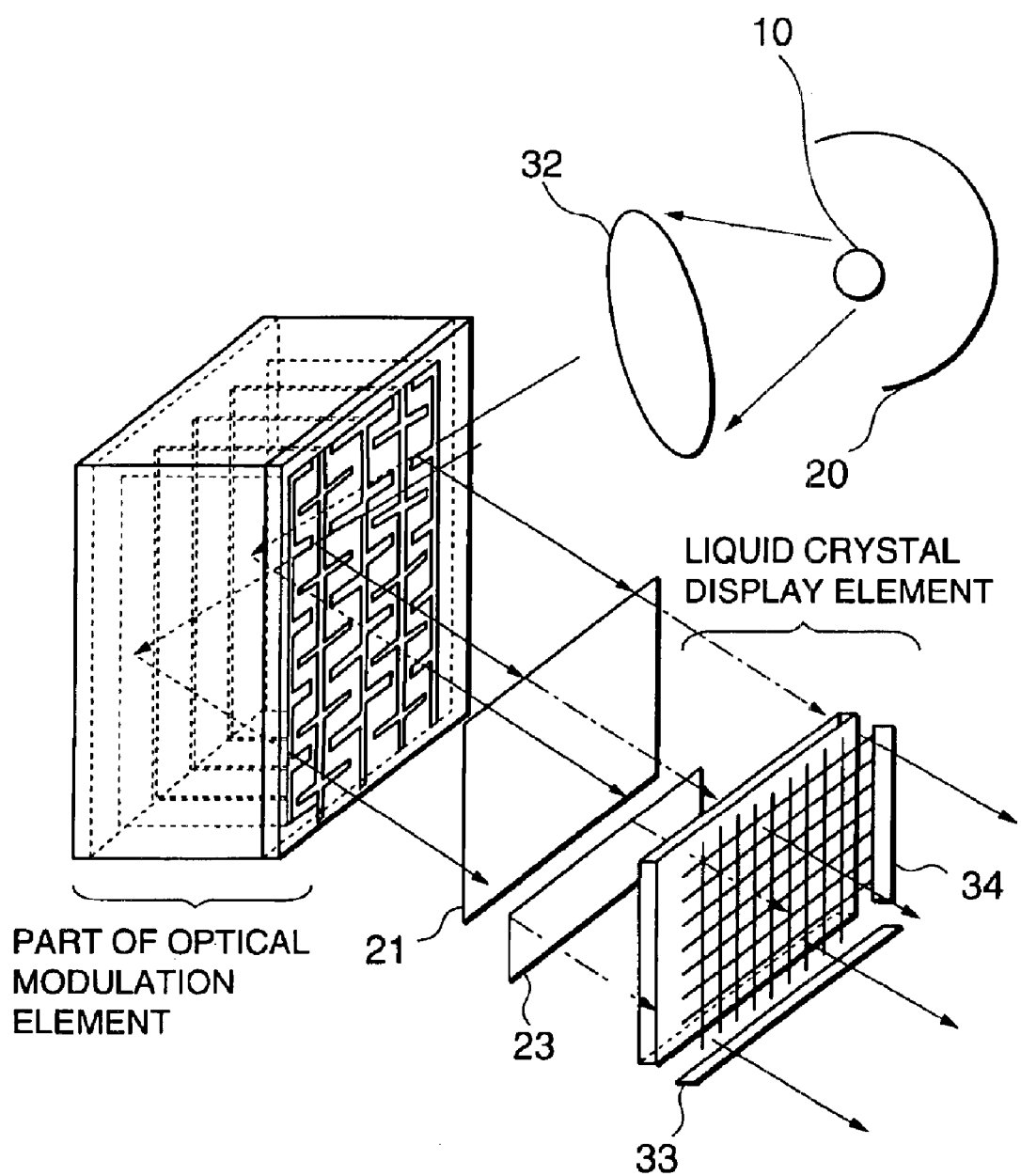
FIG. 13 is a perspective view showing a liquid crystal display device according to an embodiment of the present invention.

FIG. 13 is a schematic view showing a liquid crystal display device, which is formed by combining an optical modulation element according to the present invention and liquid crystal display elements having a shutter function, and which performs field sequential display. In FIG. 13, as the optical modulation elements, ones having a plurality of patterned electrodes identical to those shown in FIG. 11 are used. When voltages to be applied to the respective electrodes are scan-controlled in synchronism with the scanning operation of the liquid crystal display elements, field sequential display can be performed without producing any time periods where light is wasted. A means such as a collimator lens 32 is added to send the light, emerging from the light source onto the optical modulation element, close to parallel light.

When a λ/4 plate and a λ/2 plate identical to those shown in FIGS. 4 and 5 are provided to convert circularly polarized light beams having a selected wavelength into linearly polarized light beams in the same direction, liquid crystal display elements utilizing polarization can be used as the liquid crystal display elements serving as shutters.

Figure 14:
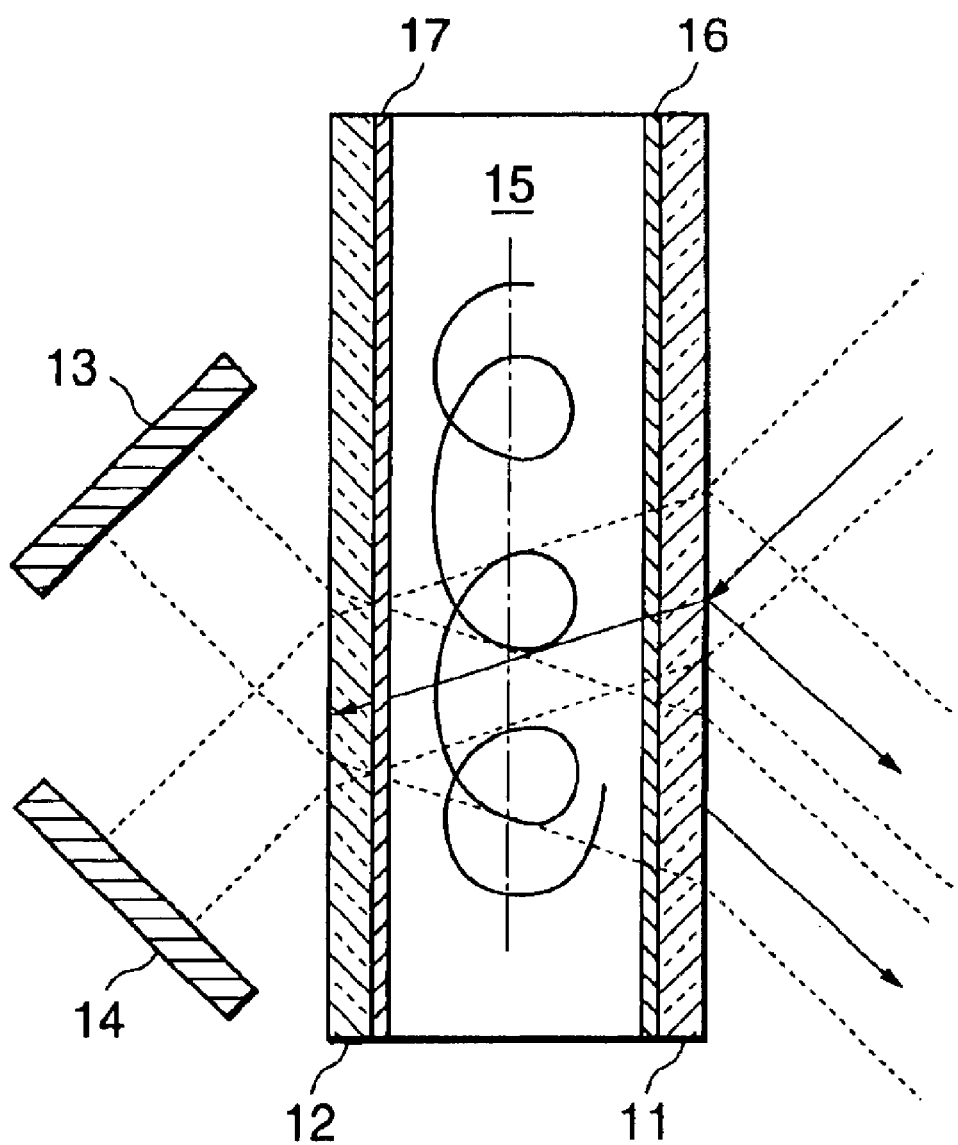
FIG. 14 is a sectional view showing a liquid crystal optical modulation element according to the present invention when the helix axis is present in a direction parallel to the substrate surfaces.

In the respective embodiments described above, the helix axis of the liquid crystal is present in a direction perpendicular to the substrate surface. As shown in FIG. 14, when the helix axis is present in a direction parallel to the substrate surface, the present invention is also effective. Light beams within the selected wavelength range, including entirely reflected light beams near the selected wavelength, can be selectively reflected in accordance with the condition for Bragg reflection.

For example, when the mirrors are removed from the liquid crystal optical modulation element of the present invention and are provided to the outside of a structure having two or three layers, light can also be efficiently derived without returning it to the light source. In this case, if the optical paths are devised, light beams of the respective colors may be split in a direction parallel to the incident surface.

More practical several examples of the present invention will be described.

EXAMPLE 1

Transparent electrodes were formed on a glass substrate by using indium tin oxide (ITO) by sputtering, and were patterned interdigitally as shown in FIG. 12. Alignment films were formed on this and another glass substrates by coating, and were subjected to a horizontal alignment process by rubbing. This pair of substrates were arranged face to face and their gap was adjusted to 10 μm with spherical spacers each having a diameter of about 10 μm. A nematic liquid crystal having a positive dielectric anisotropy was charged between these substrates. This liquid crystal has an average refractive index n of 1.51. The helix of the liquid crystal is twisted counterclockwise, and has a helix pitch p of 540 nm. A saw-toothed mirror was arranged outside one transparent substrate. The angle between the mirror surfaces is 90°.

In Example 1, light within a specific wavelength range was reflected efficiently without substantially any loss. The wavelength range of the selectively reflected light could be switched by applying an electric field.

EXAMPLE 2

Transparent electrodes were formed on two glass substrates by using indium tin oxide (ITO) by sputtering, and were patterned into stripes as shown in FIG. 10. Alignment films were formed on the transparent electrodes of the two substrates by coating, and were rubbed to produce a pretilt angle of about 60°. This pair of substrates were arranged face to face and their gap was adjusted to 10 μm with spherical spacers each having a diameter of about 10 μm. A liquid crystal having an SmC* phase was injected between these substrates. This liquid crystal has an average refractive index n of 1.53. The helix of the liquid crystal is twisted clockwise, and has a helix pitch p of 532 nm. A saw-toothed mirror was arranged outside one transparent substrate. The angle between the mirror surfaces is 90°.

In Example 2 as well, the wavelength range of the selectively reflected light could be switched by applying an electric field. In particular, this switching operation can be performed faster than in Example 1. When blue light was selected, reflection by the full-pitch band occurred in part of the wavelength range of red light. In particular, when light within the wavelength of 380 nm to 400 nm was also allowed to be reflected, selective reflection by the full-pitch band occurred in the region of 760 nm to 800 nm. Therefore, the wavelength range of blue light was set to about 400 nm at maximum.

EXAMPLE 3

Transparent electrodes were formed on a glass substrate by using indium tin oxide (ITO) by sputtering, and were patterned interdigitally as shown in FIG. 11. Alignment films were formed on this and another glass substrates by coating, so that perpendicular orientation (a pretilt angle of about 90°) could be obtained because of the function of the alignment films. This pair of substrates were arranged face to face and their gap was adjusted to 10 μm with spherical spacers each having a diameter of about 10 μm. An antiferroelectric liquid crystal having an SmCA* phase was injected between these substrates. This liquid crystal has an average refractive index n of 1.51. The helix of the liquid crystal is twisted counterclockwise, and has a helix pitch p of 540 nm.

Two mirrors were arranged outside this element to make an angle of 90° with each other and an angle of 45° with the substrates so as not to interfere with the optical path. Furthermore, a λ/4 plate 21 and a λ/2 plate 23 were arranged as shown in FIG. 13 to constitute the device of the sixth embodiment. A mirror 20 was arranged on a side of the light source 10 opposite to the element, and a collimator lens 32 was arranged on the element side. Light emerging from this optical modulation element was sent to become incident on liquid crystal display elements using TN liquid crystals. The liquid crystal display elements have a scanning line group and a signal line group. A scanning line driver 33 and a signal line driver 34 are connected to each liquid crystal display element. Sequential scanning was performed by synchronizing scanning of the scanning lines of the liquid crystal display elements and the optical modulation element.

In Example 3, light from the light source could be derived as output light without substantially any loss. Efficient display was performed with sequential scanning. No polarizer was needed between the optical modulation element and the liquid crystal display device, and light loss by a polarizer did not occur. Unlike Example 2, with the SmCA* phase, the full-pitch band did not occur. Therefore, the full wavelength range could be used.

What is claimed is:

1. An optical modulation element, comprising:
   a liquid crystal layer having a helix pitch p and having an average refractive index n, wherein said liquid crystal layer is held between a pair of transparent substrates having opposing transparent electrodes;
   a white light source for sending white light onto a surface of one of said transparent substrates of said liquid crystal layer in an oblique direction, said white light comprising a plurality of wavelengths including a wavelength λ, wherein said white light is incident on said liquid crystal layer at an angle θ; and
   at least one flat mirror arranged outside the other one of said transparent substrates to reflect the incident light transmitted through said liquid crystal layer toward said light source,
   wherein a light beam having said wavelength λ is selectively reflected from the liquid crystal layer, and
   wherein said selected wavelength λ is determined by selecting at least one of the incident angle θ and the helix pitch p, in accordance with the relationship p·cos θ=λ/n.

2. An optical modulation element, comprising:
   a liquid crystal layer having a helix pitch p and having an average refractive index n, wherein said liquid crystal layer is held between a pair of transparent substrates having opposing transparent electrodes;
   a white light source for sending white light onto a surface of one of said transparent substrates of said liquid crystal layer in an oblique direction, said white light comprising a plurality of wavelengths including a wavelength λ, wherein said white light is incident on said liquid crystal layer at an angle θ;
   a first flat mirror arranged outside the other one of said transparent substrates of said liquid crystal layer to reflect the incident light transmitted through said liquid crystal layer in an incident direction thereof; and
   a second flat mirror for reflecting the light reflected by said first flat mirror and by said liquid crystal layer in the incident direction thereof,
   wherein a light beam having said selected wavelength λ is selectively reflected from the liquid crystal layer, and
   wherein said selected wavelength λ is determined by selecting at least one of the incident angle θ and the helix pitch p, in accordance with the relationship p·cos θ=λ/n.

3. An element according to claim 2, wherein said first and second flat mirrors form an integrated mirror having an L-shaped section, or a saw-toothed mirror.

4. An element according to claim 3, wherein said sawtoothed mirror and the other one of said transparent substrates are integrally formed.

5. An element according to claim 1, wherein said transparent electrodes comprise transparent electrodes comprise transparent electrode groups divided into stripes such that a plane perpendicular to a longitudinal direction thereof intersects an incident surface group of the incident white light.

6. An element according to claim 2, wherein said transparent electrodes comprise transparent electrode groups divided into stripes such that a plane perpendicular to a longitudinal direction thereof intersects an incident surface group of the incident white light.

7. An optical modulation element, comprising:
- a liquid crystal layer having a helix pitch and held between a pair of transparent substrates having opposing transparent electrodes;
- a white light source for sending white light onto a surface of one of said transparent substrates of said liquid crystal layer in an oblique direction;
- a first flat mirror arranged outside the other one of said transparent substrates of said liquid crystal layer to reflect the incident light transmitted through said liquid crystal layer in an incident direction thereof; and
- a second flat mirror for reflecting the light reflected by said first flat mirror and by said liquid crystal layer in the incident direction thereof,
- wherein an output optical path of a circularly polarized light beam having a selected wavelength and reflected by a liquid crystal surface at one of said transparent substrates, and an output optical path of a circularly polarized light beam having a selected wavelength and reflected by said first and second flat mirrors and a liquid crystal surface at the other one of said transparent substrates do not overlap each other.

8. An element according to claim 7, wherein a rotational polarizer and a λ/4 plate are arranged in said optical path of one circularly polarized light beam of exit light while a λ/4 plate is arranged in an optical path of the other circularly polarized light beam, and exit light beams from said two optical paths are converted into one linearly polarized light beam to be output.

9. An element according to claim 8, wherein said λ/4 plate arranged in said optical path of one circularly polarized light beam of the exit light and said λ/4 plate arranged in said optical path of the other circularly polarized light beam comprise one λ/4 plate.

10. An element according to claim 2, wherein an output optical path of a circularly polarized light beam having the wavelength λ and reflected by a liquid crystal surface at one of said transparent substrates and an output optical path of a circularly polarized light beam having the wavelength λ and reflected by said first and second flat mirrors and a liquid crystal surface at the other one of said transparent substrates overlap each other at least partially.

11. An element according to claim 1, wherein a medium having a refractive index lower than that of said liquid crystal is inserted at least one of between said transparent substrates and said mirror and between said transparent substrates and said incident surface of the incident light.

12. An element according to claim 2, wherein a medium having a refractive index lower than that of said liquid crystal is inserted at least one of between said transparent substrates and said mirror and between said transparent substrates and said incident surface of the incident light.

13. An element according to claim 1, wherein said liquid crystal has a helix axis substantially perpendicular to a substrate surface.

14. An element according to claim 2, wherein said liquid crystal has a helix axis substantially perpendicular to a substrate surface.

15. An element according to claim 1, wherein said liquid crystal has a helix axis substantially parallel to a substrate surface.

16. An element according to claim 2, wherein said liquid crystal has a helix axis substantially parallel to a substrate surface.

17. An element according to claim 1, wherein one of a chiral nematic liquid crystal (cholesteric liquid crystal) and a nematic liquid crystal added with a chiral material is used as the liquid crystal having said helix pitch.

18. An element according to claim 2, wherein one of a chiral nematic liquid crystal (cholesteric liquid crystal) and a nematic liquid crystal added with a chiral material is used as the liquid crystal having said helix pitch.

19. An element according to claim 1, wherein a chiral smectic liquid crystal such as a ferroelectric liquid crystal and an antiferroelectric liquid crystal is used as the liquid crystal having said helix pitch.

20. An element according to claim 2, wherein a chiral smectic liquid crystal such as a ferroelectric liquid crystal and an antiferroelectric liquid crystal is used as the liquid crystal having said helix pitch.

21. An element according to claim 19, wherein a liquid crystal having a chiral smectic CA phase, which is an antiferroelectric phase, is used as the liquid crystal having said helix pitch.

22. An element according to claim 20, wherein a liquid crystal having a chiral smectic CA phase, which is an antiferroelectric phase, is used as the liquid crystal having said helix pitch.

23. A color filter which selectively outputs a light beam within a desired wavelength range by using said optical modulation element according to claim 1.

24. A color filter which selectively outputs a light beam within a desired wavelength range by using said optical modulation element according to claim 2.

25. A color filter according to claim 23, wherein a wavelength range of the selectively output light beam is changed by controlling a voltage to be applied to said electrodes.

26. A color filter according to claim 24, wherein a wavelength range of the selectively output light beam is changed by controlling a voltage to be applied to said electrodes.

27. A liquid crystal display device obtained by combining said optical modulation element according to claim 1 and a liquid crystal display element having a shutter function.

28. A liquid crystal display device obtained by combining said optical modulation element according claim 2 and a liquid crystal display element having a shutter function.

29. A liquid crystal display device obtained by combining an optical modulation element according to claim 8 and a liquid crystal display element having a shutter function, wherein a liquid crystal display element utilizing polarization is used as said liquid crystal display element.

30. A liquid crystal display device obtained by combining an optical modulation element according to claim 9 and a liquid crystal display element having a shutter function, wherein a liquid crystal display element utilizing polarization is used as said liquid crystal display element.

31. A device according to claim 27, which performs field sequential display.

32. A device according to claim 28, which performs field sequential display.

33. A liquid crystal display device which performs field sequential display and is obtained by combining an optical modulation element according to claim 5 and a liquid crystal display element having a shutter function, wherein sequential scanning is performed by synchronizing said liquid crystal display element and said optical modulation element having one of a transparent electrode group and an electrode structure group, said optical modulation element having a longitudinal direction which perpendicularly intersects an incident surface of the incident light.

34. A liquid crystal display device which performs field sequential display and is obtained by combining an optical modulation element according to claim 6 and a liquid crystal display element having a shutter function, wherein sequential scanning is performed by synchronizing said liquid crystal display element and said optical modulation element having one of a transparent electrode group and an electrode structure group, said optical modulation element having a longitudinal direction which perpendicularly intersects an incident surface of the incident light.

35. An optical modulation element according to claim 1, wherein said optical modulation element does not include a polarization plate.

36. An optical modulation element according to claim 1, wherein:
said liquid crystal layer is reflective to a wavelength range of light, if the light is of a circular polarity selected from the group consisting of left and right;
said liquid crystal layer is transparent to the wavelength range of light, if the light is of a circular polarity opposite that of light which is reflected by said liquid crystal layer;
said liquid crystal layer is transparent to light outside the wavelength range; and
the wavelength range is dependent upon the helix pitch of said liquid crystal layer, the wavelength range including at least a first wavelength of the wavelength $\lambda$, and excluding at least a second wavelength of the white light.

37. An optical modulation element according to claim 2, wherein said optical modulation element does not include a polarization plate.

38. An optical modulation element according to claim 2, wherein:
said liquid crystal layer is reflective to a wavelength range of light, if the light is of a circular polarity selected from the group consisting of left and right;
said liquid crystal layer is transparent to the wavelength range of light, if the light is of a circular polarity opposite that of the light which is reflected by said liquid crystal layer;
said liquid crystal layer is transparent to light outside the wavelength range; and
the wavelength range is dependent upon the helix pitch of said liquid crystal layer, the wavelength range including at least a first wavelength of the wavelength $\lambda$, and excluding at least a second wavelength of the white light.

39. An element according to claim 2, wherein an output optical path of a circularly polarized light beam having the wavelength $\lambda$ and reflected by a liquid crystal surface at one of said transparent substrates, and an output optical path of a circularly polarized light beam having the wavelength $\lambda$ and reflected by said first and second flat mirrors and a liquid crystal surface at the other one of said transparent substrates do not overlap each other.

40. An element according to claim 39, wherein a rotational polarizer and a $\lambda/4$ plate are arranged in said optical path of one circularly polarized light beam of exit light while a $\lambda/4$ plate is arranged in an optical path of the other circularly polarized light beam, and exit light beams from said two optical paths are converted into one linearly polarized light beam to be output.

41. An element according to claim 40, wherein said $\lambda/4$ plate arranged in said optical path of one circularly polarized light beam of the exit light and said $\lambda/4$ plate arranged in said optical path of the other circularly polarized light beam comprise one $\lambda/4$ plate.

42. A color light filter according to claim 23, wherein:
said liquid crystal layer is reflective to the desired wavelength range of light, if the light is of a circular polarity selected from the group consisting of left and right;
said liquid crystal layer is transparent to the desired wavelength range of light, if the light is of a circular polarity opposite that of the light which is reflected by said liquid crystal layer;
said liquid crystal layer is transparent to light outside the predetermined wavelength range.

43. A color light filter according to claim 42, wherein the desired wavelength range of the selectively output light beam is changed by controlling a voltage to be applied to the transparent electrodes, thereby changing the helix pitch of the liquid crystal layer.

44. A color light filter according to claim 23, wherein the wavelength range of the selectively output light beam is changed by controlling a voltage to be applied to the transparent electrodes, thereby changing the helix pitch of the liquid crystal layer.

45. A color light filter according to claim 24, wherein:
said liquid crystal layer is reflective to the desired wavelength range of light, if the light is of a circular polarity selected from the group consisting of left and right;
said liquid crystal layer is transparent to the desired wavelength range of light, if the light is of a circular polarity opposite that of the light which is reflected by said liquid crystal layer;
said liquid crystal layer is transparent to light outside the predetermined wavelength range.

46. A color light filter according to claim 45, wherein the desired wavelength range of the selectively output light beam is changed by controlling a voltage to be applied to the transparent electrodes, thereby changing the helix pitch of the liquid crystal layer.

47. A color light filter according to claim 24, wherein the desired wavelength range of the selectively output light beam is changed by controlling a voltage to be applied to the transparent electrodes, thereby changing the helix pitch of the liquid crystal layer.

* * * * *